UNITED STATES PATENT OFFICE 2,209,129

PLANT PEST CONTROL COMPOSITION

Hans Mengele and Hans Huber, Wiesbaden, Germany

No Drawing. Application September 2, 1939, Serial No. 293,288. In Germany September 28, 1935

7 Claims. (Cl. 167—14)

This invention relates to an improved composition for plant pest control, and more particularly to the use of heavy metal polyphosphates for this purpose.

Copper, arsenic, fluorine, and sulfur compounds, and in particular arsenates and sulfates of the heavy metals, have been used heretofore for plant pest control, seed disinfection, mold prevention, etc. Agents of this type include the salts and organic heavy metal compounds.

The salts in general have an acid reaction and therefore tend to burn or sterilize the plants and must be handled with great care and in small proportions. On the other hand, the organic compounds can be prepared only with great difficulty in special apparatus. The organic portion of these compounds is likewise injurious to the plant. In those cases where very sparingly soluble or insoluble heavy metal compounds, such as basic salts, oxides, or hydroxides, are employed, it is necessary to use large amounts of these materials in order to obtain the desired action. Frequently it is very difficult to suspend or maintain in suspension such materials.

As an example of the difficulty encountered in such materials, copper sulfate is a good pest control material. If used, however, in its natural form, it is acid and very dangerous to the plants. Consequently it is ordinarily precipitated by lime or soda when applied as an insoluble material in suspension. The suspension is difficult to spray and requires very much more copper than would be necessary if a soluble salt could be used.

It has now been discovered that the soluble heavy metal polyphosphates retain the desirable pest control characteristics of the heavy metals and at the same time avoid the difficulties heretofore mentioned.

The term "polyphosphate" is here used to mean a salt of those phosphoric acids which have less combined water than pyrophosphoric acid and more than metaphosphoric acid. Because of their polybasic character the pH values of these salts can be controlled almost at will by including in the metallic portion thereof both alkali metal and heavy metal atoms. For example, copper - sodium tetrapolyphosphate ($CuNa_4P_4O_{13}$) is weakly alkaline and readily soluble.

The soluble heavy metal-alkali metal polyphosphates may be prepared by fusing together in the desired proportions appropriate heavy metal compounds and alkali metal orthophosphates. For example, 4 mols of monosodium orthophosphate and 1 mol of copper oxide may be fused together to give a copper-sodium tetrapolyphosphate ($CuNa_4P_4O_{13}$). Mixed alkali metal and heavy metal-alkali metal polyphosphates are also suitable as spray agents. For example, a product made by fusing together 100 parts of monosodium phosphate, 20 parts of disodium phosphate, and 11 parts of copper oxide is quite suitable for the control of peronospora on plants. Similarly a polyphosphate composition containing 7.2% cerium in soluble form was made by fusing 120 parts monosodium orthophosphate and 10 parts of cerium oxide ($Ce_2O_3$) at red heat in the presence of reducing gases. In a like manner it is possible to prepare other soluble polyphosphates by heating the desired proportions of heavy metal salts and alkali metal phosphates.

For the purpose of plant pest control the soluble alkali metal-heavy metal polyphosphates may be used together with known pest control agents, spreading agents, or diluents. For example, a concentrated lead sodium polyphosphate was absorbed by a mixture of 80 parts talcum and 20 parts sodium fluoride and the mixture dried. The resulting powder was very toxic against insects and mold.

A 0.5% solution of a copper sodium arsenic polyphosphate sprayed on vines was quite effective in controlling peronospora and "Sauerwurm."

Wheat was disinfected by being brought in contact with a 0.7% copper sodium polyphosphate solution for 30 minutes.

For comparative purposes a commercial lime-copper sulfate spray was checked against a sodium copper polyphosphate spray in controlling the growth of peronospora. The polyphosphate was effective at a 0.03% copper concentration whereas with the commercial copper spray a 0.17% copper concentration was required to prevent growth of peronospora.

We claim:

1. A plant pest control composition containing as its essential active toxic ingredient a soluble alkali metal heavy metal salt of a polyphosphoric acid.

2. A plant pest control composition containing as its essential active toxic ingredient a soluble heavy metal salt of a polyphosphoric acid, together with a major portion of a suitable diluent.

3. A plant pest control composition containing as an essential active toxic ingredient copper-sodium-arsenic tetrapolyphosphate.

4. A plant pest control composition containing as an essential active toxic ingredient copper-sodium tetrapolyphosphate.

5. A plant pest control composition containing as an essential active toxic ingredient a soluble alkali metal-heavy metal polyphosphate.

6. A composition as set forth in claim 5 in which the heavy metal is copper.

7. A plant pest control composition comprising an aqueous solution of an alkali metal-heavy metal polyphosphate.

HANS MENGELE.
HANS HUBER.